United States Patent [19]

Borrelli et al.

[11] Patent Number: 4,979,975

[45] Date of Patent: Dec. 25, 1990

[54] FAST RESPONSE PHOTOSENSITIVE OPAL GLASSES

[75] Inventors: Nicholas F. Borrelli, Elmira; James E. Dickinson, Jr., Corning; Joseph E. Pierson; S. Donald Stookey, both of Painted Post, all of N.Y.

[73] Assignee: Corning Incorporated, Corning, N.Y.

[21] Appl. No.: 390,064

[22] Filed: Aug. 7, 1989

[51] Int. Cl.$^5$ .............................................. C03C 15/00
[52] U.S. Cl. .................................. 65/30.11; 65/32.3; 501/13
[58] Field of Search ....................... 65/30.11, 32.3, 63, 65/90, 111; 501/13, 30, 56, 64, 57

[56] References Cited

U.S. PATENT DOCUMENTS

| | | | |
|---|---|---|---|
| 2,477,329 | 7/1949 | DeGier et al. | 250/141 |
| 2,651,145 | 9/1953 | Stookey | 65/63 |
| 4,017,318 | 4/1977 | Pierson et al. | 501/64 |
| 4,057,408 | 11/1977 | Pierson et al. | 65/30.11 |
| 4,092,139 | 5/1978 | Ference | 501/13 |
| 4,134,747 | 1/1979 | Pierson et al. | 65/32.3 |

FOREIGN PATENT DOCUMENTS 60-234853 11/1985 Japan.
62-223828 10/1987 Japan.
63-166736 7/1988 Japan.
63-312662 12/1988 Japan.

*Primary Examiner*—Kenneth M. Schor
*Assistant Examiner*—John J. Bruckner
*Attorney, Agent, or Firm*—Clinton S. Janes, Jr.

[57] ABSTRACT

Photosensitively opacifiable glasses requiring very short exposures to ultraviolet radiation to effect the development of opacity are processed by heating to nucleate Ag followed by cooling to nucleate NaF on the Ag followed by heating to grow the NaF. The glasses contain, expressed in terms of weight percent on the oxide basis, about 14–18% $Na_2O$, 0–6% $ZnO$, 6–12% $Al_2O_3$, 0–5% $B_2O_3$, 65–72% $SiO_2$, and 0–0.2% $Sb_2O_3$, and 0.007–0.04% Ag, 0.008–0.05% $CeO_2$, 0.7–1.25% Br, and 1.5–2.5% F as analyzed in the glass, the sum of those components are at least 90% of the total composition.

8 Claims, No Drawings

FAST RESPONSE PHOTOSENSITIVE OPAL GLASSES

BACKGROUND OF THE INVENTION

Photosensitively opacifiable glasses or glasses which can be thermally opacified after being exposed to ultraviolet radiation were initially disclosed over 35 years ago. Such glasses have been referred to by the shorthand term of photosensitive opal glasses. U.S. Pat. No. 651,145 (Stookey) describes such glasses consisting essentially, expressed in terms of weight percent on the oxide basis, of 55–75% $SiO_2$, 12–18% $R_2O$, wherein $R_2O$ consists of 0–2% $Li_2O$, 5–18% $Na_2O$, and 0–13% $K_2O$, 2–12% $Al_2O_3$, 0.005–0.05% $CeO_2$, 0.0001–0.3% Ag computed as AgCl, and, as analyzed, 1.8–3% fluorine, and the indicated proportion of a halogen selected from the group consisting of 0.01–2% chlorine, 0.02–0.4% bromine, and 0.03–0.6% iodine, the sum of those constituents composing at least 85% of the total composition. As extraneous components the patent noted that BeO, MgO, and CaO should not be present in amounts greater than 3%, either separately or collectively. Up to 12% BaO, SrO, and ZnO may be included either separately or collectively. Up to 5% CdO may be added. Nevertheless, the total of all of the above divalent metal oxides should not exceed 12%.

Materials strongly absorbing of ultraviolet radiations should be avoided. Explicit reference was made to glass colorants such as selenium and its compounds, and oxides of iron, copper, uranium, and vanadium, as well as the noncoloring oxides of arsenic, lead, and thallium.

The patent also noted the utility of up to 0.2% $Sb_2O_3$ or up to 0.1% $SnO_2$ for increasing the photosensitivity of the glass. Greater levels of each were observed to destroy photosensitivity, however. Because of the concomitant fining action exerted by $Sb_2O_3$, its inclusion was preferred to that of $SnO_2$.

The mechanism providing opacity to the glasses was defined in the following terms. The glasses as melted and shaped were clear and transparent, and will remain so when merely reheated. Exposure to short wave radiations, however, preferably those having wavelengths between 3000–3500 Å (ultraviolet radiations), produces an invisible latent image therein. Thus, exposure to ultraviolet radiation causes the photolytic reduction of $Ag^+$ ions to silver metal ($Ag°$), as exemplified by the following reaction

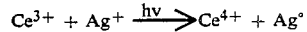

$$Ce^{3+} + Ag^+ \xrightarrow{h\nu} Ce^{4+} + Ag°$$

wherein hv represents a photon of electromagnetic radiation. That latent image, present only in the exposed portions of the glass, is converted to a visible opaque image upon a subsequent three-stage heat/cool treatment.

In the first stage the exposed glass was heated for a time and at a temperature varying from about one minute at 50° C. above the softening point of the glass to about one hour at about 150° C. below the softening point of the glass. Temperatures lower than 150° C. below the softening point were cited as being ineffective, and temperatures higher than 50° C. above the softening point were asserted to be both impractical and detrimental to the image. It was postulated that this initial heat treatment caused the development of submicroscopic nuclei of colloidal silver, but with no visible change in appearance. (It was observed that, where the content of silver exceeded about 0.002%, the silver nuclei generated were of a size and number sufficient to impart a yellow coloration to the glass.)

In the second stage the glass article was cooled to a temperature at least below 500° C. No visible change occurs in the glass but it was conjectured that submicroscopic nuclei of the opacifying agent, i.e., an alkali metal fluoride, are formed on the colloidal silver nuclei as a result of the cooling. The degree of cooling below 500° C. was not critical, e.g., the glass could be cooled to room temperature, but the step of cooling below 500° C. was absolutely vital to achieve the desired opacification.

In the third stage the glass article was reheated to a temperature not lower than about 100° C. below the softening point of the glass for a sufficient period of time to cause the fluoride nuclei to grow and form opacifying crystallites. The opacifying crystallites develop only in the irradiated portions of the glass article.

Photosensitively opacifiable glasses prepared in accordance with the method outlined in U.S. Pat. No. 2,651,145 containing NaF crystallites as the opacifying phase have been marketed commercially by Corning Incorporated, Corning, New York for more than 30 years under the trademark FOTALITE®. One such glass which has been marketed as flat panels for architectural applications as Corning Code 8607 consists of the following approximate composition, analyzed in terms of weight percent:

| | | | | | |
|---|---|---|---|---|---|
| $SiO_2$ | 70.4 | F | 2.5 | Ag | 0.0008 |
| $Na_2O$ | 16.36 | $Sb_2O_3$ | 0.20 | *$Co_3O_4$ | 0.005 |
| ZnO | 5.0 | Br | 0.5 | *NiO | 0.05 |
| $Al_2O_3$ | 8.0 | $CeO_2$ | 0.015 | SnO | 0.01 |

*Colorants to impart a light gray tint thereto.

In commercial manufacture, the heat treatment applied to the glass subsequent to exposure to ultraviolet radiation has utilized a three-stage schedule comprising heating to about 540° C. and holding at that temperature for about one hour, cooling to a temperature below about 300° C., reheating to about 580° C. and holding thereat for about one hour, followed by cooling to room temperature.

In general, the glass panels fabricated for architectural applications have wall thicknesses about ¼" (≈6 mm). As can be appreciated, to assure that the panels exhibit essential total opacity there is the need for the opacifying crystallites to be present in substantial concentrations throughout the full thickness of the panel wall. An extremely practical problem that has been present in the above composition is the very long period of exposure to ultraviolet radiation which the panels require in order to achieve dense opacification throughout the cross section thereof. Hence, periods of exposure in excess of one hour to a Hg-Xe arc lamp at 1000 watts power have proven to be necessary.

Although it would seem that the photographic speed of a photosensitive opal glass is a simple number, inversely proportional to time, in point of fact several factors must be studiously controlled to optimize sensitivity. These factors include:

(1) the need for the photographic pattern to uniformly penetrate the full thickness dimension of the glass; i.e., to assure minimum attenuation of ultraviolet radiation through the glass;

(2) the integrated sensitivity as a function of ultraviolet radiation wavelength, thickness of the glass, and optical absorption spectrum of the glass;

(3) the optical emission spectrum and intensity of the exposing light source; together with the absorption spectrum of any filter or negative film interposed between the light source and the glass; and (4) the temperature of the glass during exposure to ultraviolet radiation.

Nevertheless, it was appreciated that each of those factors could be influenced by glass composition. Therefore, the primary objective of the invention was to develop transparent glass compositions requiring much shorter periods of exposure to ultraviolet radiation of a given intensity in order to demonstrate essentially total opacification throughout the thickness dimension of a glass article.

SUMMARY OF THE INVENTION

Various avenues of approach to solving the problem were initiated. To illustrate:

As was explained in U.S. Pat. No. 2,651,145, the presence of ultraviolet radiation absorbing materials ought to be avoided. Therefore, in one approach the use of batch materials of high purity was investigated. Some improvement in photographic speed was witnessed when the impurity levels of $Fe_2O_3$ and $TiO_2$ in the batch materials, notably the sand utilized as the source of $SiO_2$, totalled less than 100 ppm. Therefore, in the most preferred compositions $Fe_2O_3$ and $TiO_2$ (and any other materials strongly absorbing of ultraviolet radiation) will be essentially absent, i.e., the total thereof will be less than 25 ppm. The colorants NiO and $Co_3O_4$ are moderately absorbing of ultraviolet radiation and will be omitted in applications where a gray color is not required.

In a second approach, the exposure to ultraviolet radiation was carried out with the glass at an elevated temperature. A significant improvement in photographic speed was observed when the exposure was conducted on glass held at a temperature of at least about 300° C., but less than about 450° C. Hence, the preferred practice contemplates exposing the glass to ultraviolet radiation at elevated temperatures.

In a third and more fundamental approach, a glass composition study was undertaken to determine whether significant improvements in photographic speed could be achieved through variations in the composition of Corning Code 8607 glass. As was observed above, that glass contains $Sb_2O_3$, $SnO_2$, and ZnO. Those oxides are relatively readily reducible and, thus, are undesirable in glass compositions which are to be formed into sheet using the float process. (ZnO is present to provide an easily-melted, stable glass.) Therefore, Corning Code 8607 glass is not amenable to the float glass process and this composition study had as a secondary goal the development of photosensitively opacifiable glasses essentially free from readily reducible oxides which could be formed as sheet utilizing the float process, with the added plus of demonstrating high photographic speeds. The ability to use the float glass process is extremely beneficial in producing sheet glass for architectural and other applications requiring the use of large glass sheets.

We have found that the concentrations of fluoride and bromide are especially critical in securing more rapid exposure periods. Hence, F, as analyzed, should be held within the range of 1.5-2.5% by weight and Br, as analyzed, should be held within the range of 0.7-1.25% by weight. (This Br content exceeds that specified in U.S. Pat. No. 2,651,145 and that present in Corning Code 8607.) Care must be exercised in the incorporation of these components, however, inasmuch as the inclusion of both at high levels hazards the development of opalization in the glass in areas not previously exposed to ultraviolet radiation. Accordingly, at Br concentrations in excess of about 1%, the F content will preferably be maintained no higher than about 2.1%. Conversely, at F concentrations above about 2.1%, the Br levels will preferably be maintained below about 1%.

The sensitivity or photographic speed of photosensitively opacifiable glasses is related to the absorption coefficient(s) for the incident actinic radiation and the integrated energy of all the wavelengths in the band of ultraviolet radiation, whose long wave cutoff is 3500 Å, incident on the glass surface. The glass ingredients that affect the sensitivity are primarily the silver ions and the optical sensitizer cerous ions ($Ce^{+3}$). The ultraviolet absorption spectrum of cerous ions is also the sensitivity spectrum of the glass. Secondary, but important, effects on sensitivity include competitive absorption by cerium and other ions in the ultraviolet radiation region of the spectrum. Thus, for each effective exposure wavelength employed (preferably monochromatic ultraviolet radiation of about 3300 Å, the concentration of the cerium oxide sensitizer must be held sufficiently low so as not to excessively attenuate the exposing radiation.

We found that the photographic speed demonstrated by a glass having a constant level of ceria ($CeO_2$) can be accelerated with greater concentrations of Ag so long as the $CeO_2$ content is at least approximately equivalent in moles to that of the Ag, such that the reaction set out in the above equation can go to completion. This improvement in speed is reduced, however, when the molar concentration of Ag exceeds that of the $CeO_2$.

This finding pointed to raising the photographic speed by increasing the $CeO_2$ content in a manner equivalent to the Ag content on a molar basis as the concentration of Ag is raised. Thus, the levels of both Ag and $CeO_2$ are increased, but in such proportions as to assure their presence in approximate by equal molar concentrations. Nevertheless, this acceleration in photographic speed is progressively counteracted at shorter wavelengths which are increasingly absorbed by the cerium ions. Accordingly, to assure high photographic speed, the Ag content, as analyzed, will range about 0.007-0.04% by weight and the level of $CeO_2$, as analyzed, will be held between about 0.008-0.05% by weight.

In summary, we have discovered that by maintaining the concentrations of F, Br, Ag, and $CeO_2$ within the limits specified above, exposure times below one minute and commonly below 10 seconds to the above-described arc lamp will be sufficient to produce essentially total opacification throughout a glass body having a thickness of 0.25" ($\approx 6$ mm). Furthermore, we have found that glasses demonstrating such capability can be prepared from base compositions essentially free from readily reducible oxides. Those base compositions consist essentially, expressed in terms of weight percent on the oxide basis, of about 14-18% $Na_2O$, 0-6% ZnO, 6-12% $Al_2O_3$, 0-5% $B_2O_3$, and 65-72% $SiO_2$. It has been found desirable to include a very minor amount of $Sb_2O_3$ to inhibit solarization, i.e., yellowing resulting from exposure to ultraviolet radiation such as is received in the presence of sunlight. However, concentrations of as little as 0.01–0.02% can be effective for that purpose. It will be appreciated, of course, that greater amounts, i.e., up to 0.2%, can be used in applications where its readily reducible character is not a problem.

As was observed in U.S. Pat. No. 2,651,145, minor additions of various compatible metal oxides can be included. Nevertheless, to assure the most rapid photographic speed, coupled with good glass stability and the absence of undesirable opalization in unexposed areas, the concentrations of individual additions must be carefully delimited, and the sum of all base glass components in addition to $Na_2O$, $ZnO$, $Al_2O_3$, $B_2O_3$, and $SiO_2$ will be less than 10% and, most preferably, less than 5%. As examples of such extraneous oxides, the concentration of $Li_2O$ should be maintained below 2%, that of $K_2O$ ought not to exceed 5%, that of $SnO$ kept below 0.1%, that of $BeO$ and/or $MgO$ and/or $CaO$ should be held below 3%, and that of $BaO$ and/or $SrO$ and/or $CdO$ ought to be retained no higher than 5%. Chloride may be present in amounts up to 0.1% and iodide in amounts up to 0.2%.

The overall method for preparing the inventive glasses comprises the following eight general steps:

(a) melting a batch for a glass consisting essentially, expressed in terms of weight percent on the oxide basis, of about 14–18% $Na_2O$, 0–6% $ZnO$, 6–12% $Al_2O_3$, 0–5% $B_2O_3$, 65–72% $SiO_2$, and 0–0.2% $Sb_2O_3$, and, as analyzed in the glass, 0.007–0.04% Ag, 0.008–0.05% $CeO_2$, 0.7–1.25% Br, and 1.5–2.5% F., the sum of those components constituting at least 90% of the total composition;

(b) cooling said melt to a temperature at least below the transformation range thereof and simultaneously forming a glass body of a desired geometry therefrom;

(c) exposing at least a portion of said glass body to ultraviolet radiation having wavelengths between about 3000–3500 Å (preferably between about 3300–3400 Å for most uniform penetration);

(d) heating at least said exposed portion of said glass body to a temperature between about 150° C. below the softening point of said glass to about 50° C. above the softening point of said glass for a sufficient length of time to develop nuclei of colloidal silver in said glass body;

(e) cooling at least said exposed portion of said glass body to a temperature below 500° C. to cause the development of NaF nuclei on said colloidal silver;

(f) reheating at least said exposed portion of said glass body to a temperature no lower than about 100° C. below the softening point of said glass for a sufficient length of time to cause the growth of opacifying NaF crystallites on said nuclei; and then (g) cooling said glass body to room temperature.

DESCRIPTION OF PREFERRED EMBODIMENTS

Table I illustrates the deleterious effect upon photographic speed which the presence of relatively small amounts of $Fe_2O_3$ and/or $TiO_2$ exerts. The glass compositions are recorded in terms of parts by weight on the oxide basis, as calculated from the batch, except for the concentrations of $TiO_2$ and $Fe_2O_3$ which are tabulated as parts per million (ppm). Because it is not known definitely with which cation(s) the fluoride and bromide are combined, they are simply reported as fluoride and bromide. Also, because the level of silver is so small, it is merely reported as the metal Ag. Finally, inasmuch as the sum of the components closely approximates 100, for all practical purposes the values in Table I may be deemed to reflect weight percent.

In general, the fluoride content was incorporated in the form of $Na_2SiF_6$ and the bromide as NaBr. The concentrations of $TiO_2$ and $Fe_2O_3$ were impurities in the commercial sand forming the source of $SiO_2$. That is, $TiO_2$ and $Fe_2O_3$ were not intentionally added to the batch. Thus, the compositions containing low levels of $TiO_2$ and $Fe_2O_3$ utilized a commercial "low iron" sand. The other oxide components of the batch can be included as oxides or other compounds which, when melted together, will be converted into the desired oxide in the proper proportions. For example, the $Na_2O$ may be sourced as $Na_2CO_3$ and/or as $NaNO_3$, the latter being useful in controlling oxidation state, and the $CeO_2$ as cerium hydrate. The Ag was added in the form of an aqueous solution of $AgNO_3$ or as batch mix containing $Ag_2O$ and sand.

The batch materials were compounded, ballmilled together to assist in achieving a homogeneous melt, and then charged into platinum crucibles. After placing lids atop, the crucibles were introduced into a furnace operating at about 1400°–1450° C. and the batches melted for about 4–5 hours. Thereafter, the melts were poured into steel molds to produce glass slabs having the approximate dimensions 5"×4", and those slabs were immediately transferred to an annealer operating at 420° C. Volatilization of silver, bromide, and fluoride will be less than 25%, most preferably less than 10%.

Test samples having dimensions 2"×2" ($\approx$5 cm×5 cm) were cut from the slabs and those samples were ground and polished to a cross section of 4 mm ($\approx$0.16"). The samples were exposed for various times to the Hg-Xe arc lamp at 1000 watts power referred to above. The samples were then subjected to the following heat treatment to cause NaF to crystallize on nuclei of silver in those regions of the glass previously exposed to the ultraviolet radiation:

Heated to 450° C. at furnace rate;
Held at 540° C. for one hour;
Cooled to below 300° C.;
Reheated to 580° C. at furnace rate;
Held at 580° C. for one hour; and
Cooled to room temperature at furnace rate.

Table I also reports the time of exposure to ultraviolet radiation required to develop a dense opal phase throughout the cross section of each sample.

TABLE I

|  | 1 | 2 | 3 | 4 | 5 | 6 |
|---|---|---|---|---|---|---|
| $SiO_2$ | 69.1 | 67.4 | 70.8 | 70.8 | 67.4 | 67.4 |
| $Na_2O$ | 16.3 | 16.4 | 16.2 | 16.2 | 16.4 | 16.4 |
| $Al_2O_3$ | 6.58 | 7.83 | 8.0 | 8.0 | 7.85 | 7.85 |
| ZnO | 4.84 | 4.75 | 5.0 | 5.0 | 4.75 | 4.75 |
| F | 2.9 | 2.3 | 2.5 | 2.5 | 2.3 | 2.3 |
| Br | 0.25 | 1.1 | 1.1 | 1.1 | 0.5 | 0.7 |
| $CeO_2$ | 0.01 | 0.01 | 0.008 | 0.008 | 0.01 | 0.01 |
| Ag | 0.002 | 0.015 | 0.002 | 0.002 | 0.01 | 0.01 |
| $Sb_2O_3$ | 0.2 | 0.15 | 0.2 | 0.2 | — | — |
| $TiO_2$ | 100 | 5 | trace | 100 | <5 | <5 |
| $Fe_2O_3$ | 130 | 17 | 15 | 200 | <10 | <10 |
| Time | 45 min | 5 sec | 30 sec | 8 min | 60 sec | 40 sec |

|  | 7 | 8 | 9 | 10 | 11 |
|---|---|---|---|---|---|
| $SiO_2$ | 67.4 | 67.4 | 67.4 | 67.4 | 67.4 |
| $Na_2O$ | 16.4 | 16.4 | 16.4 | 16.4 | 16.4 |
| $Al_2O_3$ | 7.83 | 7.83 | 7.83 | 7.83 | 7.83 |
| ZnO | 4.75 | 4.75 | 4.75 | 4.75 | 4.75 |
| F | 2.3 | 2.3 | 2.3 | 2.3 | 2.3 |
| Br | 0.9 | 1.1 | 1.1 | 1.1 | 1.1 |
| $CeO_2$ | 0.01 | 0.01 | 0.01 | 0.01 | 0.01 |

TABLE I-continued

| | | | | | |
|---|---|---|---|---|---|
| Ag | 0.01 | 0.01 | 0.002 | 0.007 | 0.015 |
| TiO$_2$ | <5 | <5 | 5 | 5 | 5 |
| Fe$_2$O$_3$ | <10 | <10 | 17 | 17 | 17 |
| Time | 20 sec | 7 sec | 16 sec | 8 sec | 8 sec |

The extreme effect upon photographic speed occasioned by the presence of TiO$_2$ and/or Fe$_2$O$_3$ in the glass composition even at low levels is immediately evident upon an inspection of Table I. Hence, even at concentrations of 100 ppm (0.01%), periods of minutes rather than seconds are required to assure dense opalization through the thickness of the sample. Examples 5–11 are of particular interest in illustrating the criticality of the levels of Ag and Br to achieve the highest photographic speeds.

Tables II and IIA demonstrate the relationship between Ag and CeO$_2$ contents noted above vis-a-vis the photographic speed exhibited by a glass. Ground and polished samples of glasses having a thickness of about 3/16" ($\approx$4.8 mm) were prepared in like manner to the samples described above with relation to Table I. Corning Code 8607 glass without the Ag and CeO$_2$ contents comprised the base glass for the compositions recorded in Table II. The base glass for the compositions described in Table IIA consisted essentially, in parts by weight as calculated from the batch:

| | | | |
|---|---|---|---|
| SiO$_2$ | 72.0 | B$_2$O$_3$ | 1.0 |
| Na$_2$O | 16.2 | F | 2.3 |
| Al$_2$O$_3$ | 10.8 | Br | 1.1 |

Again, because the sum of the individual components closely approaches 100, for all practical purposes the values recorded in both Tables may be considered to represent weight percent. And, because of the similarity in melting procedures with that described with respect to the glasses of Table I, volatilization of fluoride and bromide will be less than 25% and, typically, less than 10%. The same commercial low iron sand was employed in all the glass compositions so as to negate the influence of TiO$_2$ and Fe$_2$O$_3$ impurities.

Hence, Tables II and IIA report additions of Ag and CeO$_2$ to the two base glasses whose compositions remained constant. The samples were exposed to the same Hg-Xe arc lamp utilized with the samples of Table I, and were then subjected to the same heat treatment schedule recited above with respect to Table I. Tables II and IIA also list the time of exposure (in seconds) to ultraviolet radiation required to develop a dense opal phase throughout the thickness of each sample.

TABLE II

| Example | % Ag | % CeO$_2$ | Time |
|---|---|---|---|
| 12 | 0.0004 | 0.008 | No opal |
| 13 | 0.0008 | 0.008 | 480 |
| 14 | 0.0016 | 0.008 | 180 |
| 15 | 0.0032 | 0.008 | 50 |
| 16 | 0.0064 | 0.008 | 50 |
| 17 | 0.0130 | 0.008 | 50 |
| 18 | 0.0064 | 0.016 | 50 |
| 19 | 0.0064 | 0.032 | >60 |

TABLE IIA

| Example | % Ag | % CeO$_2$ | Time |
|---|---|---|---|
| 20 | 0.002 | 0.008 | 120 |
| 21 | 0.004 | 0.008 | 60 |
| 22 | 0.008 | 0.008 | 60 |
| 23 | 0.004 | 0.010 | 20 |
| 24 | 0.008 | 0.010 | 20 |
| 25 | 0.016 | 0.010 | 10 |
| 26 | 0.008 | 0.020 | 20 |

As is particularly evident from Table IIA, the photographic speed can be increased by raising the levels of Ag and CeO$_2$. Nevertheless, the molar concentration of the CeO$_2$ should be relatively close to that of the Ag in order to impart the highest speed. That is, the photographic speed decreases as the molar concentrations of Ag and CeO$_2$ move apart.

Table III lists glasses of varying base compositions within which photosensitive opals have been developed. The glasses are reported in terms of parts by weight on the oxide basis as calculated from the batch. Yet again, because the total of the individual constituents closely approximated 100, the actual values were deemed to reflect weight percent.

Ground and polished samples of glasses having a thickness of about 3/16" ($\approx$4.8 mm) were prepared utilizing the procedure outlined above for Table I. Because of that circumstance, volatilization of fluoride and bromide was considered to be less than 25% and, most probably, less than 10%. Furthermore, the same commercial low iron sand was used in all of the batches so as to remove any effect of TiO$_2$ and Fe$_2$O$_3$ impurities on photographic speed. The samples were exposed to the same Hg-Xe arc lamp described above and then subjected to the same heat treatment schedule recorded above. The exposure time (in seconds) required to assure the development of a dense opal phase throughout the cross section of each sample is also tabulated.

TABLE III

| | 27 | 28 | 29 | 30 | 31 | 32 | 33 | 34 |
|---|---|---|---|---|---|---|---|---|
| SiO$_2$ | 69.1 | 67.7 | 67.7 | 67.7 | 67.7 | 67.7 | 67.7 | 70.1 |
| Na$_2$O | 15.5 | 16.2 | 16.2 | 16.2 | 16.2 | 16.2 | 16.2 | 16.2 |
| Al$_2$O$_3$ | 10.4 | 7.78 | 7.78 | 7.78 | 10.1 | 10.1 | 10.1 | 7.78 |
| ZnO | — | 4.72 | 2.36 | — | — | 1.18 | 2.36 | — |
| B$_2$O$_3$ | 0.96 | — | 2.36 | 4.72 | 2.36 | 1.18 | — | 2.36 |
| F | 2.5 | 2.5 | 2.5 | 2.5 | 2.5 | 2.5 | 2.5 | 2.5 |
| Br | 1.5 | 1.5 | 1.5 | 1.5 | 1.5 | 1.5 | 1.5 | 1.5 |
| Sb$_2$O$_3$ | 0.15 | 0.15 | 0.15 | 0.15 | 0.15 | 0.15 | 0.15 | 0.15 |
| CeO$_2$ | 0.01 | 0.01 | 0.01 | 0.01 | 0.01 | 0.01 | 0.01 | 0.01 |
| Ag | 0.015 | 0.015 | 0.015 | 0.015 | 0.015 | 0.015 | 0.015 | 0.015 |
| Time | 3 sec | 3 sec | 10 sec | 6 sec | 4 sec | 4 sec | 2 sec | 6 sec |

In order to illustrate the improvement in photographic speed imparted to the glass when the exposure to ultraviolet radiation is carried when the inventive glasses are at an elevated temperature, the following laboratory experiments were conducted. Six ground and polished samples of glass having a thickness of about 8 mm (≈0.3") and having the following approximate composition

| SiO₂ | 67.4 | F | 2.3 |
|---|---|---|---|
| Na₂O | 16.4 | Br | 1.1 |
| Al₂O₃ | 7.83 | Sb₂O₃ | 0.15 |
| ZnO | 4.75 | CeO₂ | 0.01 |
| | | Ag | 0.015 | were exposed to the radiation of the above-described Hg-Xe arc lamp for the times (in seconds) reported below in Table IV. One sample was exposed at room temperature (R.T.), whereas the others were heated on a hot plate capable of being regulated to the temperature recorded in Table IV and then exposed at those temperatures. Thereafter, the samples were subjected to the same heat treatment schedules outlined above with respect to the other examples. The depth of the developed opal phase is tabulated in millimeters.

TABLE IV

| Temperature | Time | Depth |
|---|---|---|
| R.T. | 2 | Nothing |
| R.T. | 4 | Visible only |
| R.T. | 6 | 1 |
| R.T. | 8 | 1.5 |
| R.T. | 10 | 2 |
| 225° C. | 2 | Nothing |
| 225° C. | 4 | 1.5 |
| 225° C. | 6 | 2 |
| 225° C. | 8 | 3 |
| 225° C. | 10 | 4 |
| 325° C. | 2 | <1 |
| 325° C. | 4 | 2 |
| 325° C. | 6 | 3 |
| 325° C. | 8 | 4.5 |
| 325° C. | 10 | 5 |
| 345° C. | 2 | 1 |
| 345° C. | 4 | 1.5 |
| 345° C. | 6 | 2.5 |
| 345° C. | 8 | 3 |
| 345° C. | 10 | 4.5 |
| 400° C. | 2 | Visible only |
| 400° C. | 4 | 1 |
| 400° C. | 6 | 2 |
| 400° C. | 8 | 2.5 |
| 400° C. | 10 | 4 |
| 500° C. | | Nothing at all times |

As can be observed from Table IV, exposure of the glass at elevated temperatures enhances the photographic speed, with temperatures between about 300°–400° C. appearing to be the most effective. Nevertheless, temperatures approaching 500° C. destroy the photosensitive capability of the glass. Accordingly, a temperature in the vicinity of 450° C. has been deemed to constitute a practical maximum.

We claim:

1. A method for making a glass article having at least a portion thereof exhibiting opacity comprising the steps of:
   (a) melting a batch for a glass consisting essentially, expressed in terms of weight percent on the oxide basis, of about 14–18% Na₂O, 0–6% ZnO, 6–12% Al₂O₃, 0–5% B₂O₃, 65–72% SiO₂, and 0–0.2% Sb₂O₃, and 0.007–0.04% Ag, 0.008–0.05% CeO₂, 0.7–1.25% Br, and 1.5–2.5% F. as analyzed in the glass, the sum of the above components constituting at least 90% of the total composition;
   (b) cooling said melt to a temperature at least below the tansformation range thereof and simultaneously forming a glass body of a desired geometry from the melt;
   (c) exposing at least a portion of said glass body to ultraviolet radiation having wavelengths between about 3000–3500 Å;
   (d) heating at least said exposed portion of said glass body to a temperature between about 150° C. below the softening point of said glass to about 50° C. above the softening point of said glass for a sufficient length of time to develop nuclei of colloidal silver in said glass body;
   (e) cooling at least said exposed portion of said glass body to a temperature below 500° C. to cause the development of NaF nuclei on said colloidal silver;
   (f) reheating at least said exposed portion of said glass body, said exposed portion not having been exposed to ultraviolet radiation subsequent to said step (c) exposing, to a temperature no lower than about 100° C. below the softening point of said glass for a sufficient length of time to cause the growth of opacifying NaF crystallites on said NaF nuclei of step (e); and then
   (g) cooling said glass body to room temperature.

2. A method for making a glass article according to claim 1 wherein said glass also contains, expressed in weight percent on the oxide basis, up to 2% Li₂O, up to 5% K₂O, up to 0.1% SnO, up to 3% BeO and/or MgO and/or CaO, up to 5% BaO and/or CdO and/or SrO, up to 0.1% Cl, and up to 0.2% I.

3. A method for making a glass article according to claim 2 wherein at least that portion of said glass body to be exposed is at a temperature of about 300°–400° C. when exposed to said ultraviolet radiation.

4. A method for making a glass article according to claim 1 wherein the maximum of TiO₂ and/or Fe₂O₃ impurities in said glass is less than 100 ppm on the oxide basis.

5. A method for making a glass article according to claim 4 wherein at least that portion of said glass body to be exposed is at a temperature of about 300°–400° C. when exposed to ultraviolet radiation.

6. A method for making a glass article according to claim 1 wherein said glass is essentially free from readily reducible oxides.

7. A method for making a glass article according to claim 6 wherein at least that portion of said glass body to be exposed is at a temperature of about 300°–400° C. when exposed to ultraviolet radiation.

8. A method for making a glass article according to claim 1 wherein at least that portion of said glass body to be exposed is at a temperature of about 300°–400° C. when exposed to said ultraviolet radiation.

* * * * *